(12) United States Patent
Wortman

(10) Patent No.: US 6,276,769 B1
(45) Date of Patent: *Aug. 21, 2001

(54) INNER WINDOW FOR A BEZEL OR HOUSING ASSEMBLY

(75) Inventor: Michael Wortman, Roseville, CA (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/302,380

(22) Filed: Apr. 30, 1999

(51) Int. Cl.⁷ ........................................................ A47F 3/00
(52) U.S. Cl. .......................................... 312/114; 312/223.2
(58) Field of Search .................................... 312/114, 140, 312/223.2; 220/305, 784, 786, 788, 796; 49/463; 160/352; 52/171.1, 214, 222; 403/13, 375

(56) References Cited

U.S. PATENT DOCUMENTS

| 4,571,897 | * | 2/1986 | Kerr .................................... 52/222 X |
| 5,004,303 | * | 4/1991 | Conway ................................ 312/140 |

* cited by examiner

Primary Examiner—Peter M. Cuomo
Assistant Examiner—Michael J. Fisher
(74) Attorney, Agent, or Firm—David A. Plettner

(57) ABSTRACT

A window is attached to a bezel, housing, or other assembly. The bezel, housing, or other assembly has a series of pins surrounding an opening, and the window has a corresponding series of holes. The centers of the holes are slightly off-center from the centers of the pins in one dimension. When the window is pressed into place over the opening, the window deflects slightly. This deflection causes the edges of the holes to "dig into" the pins, and retains the window in place over the opening.

21 Claims, 5 Drawing Sheets

INNER WINDOW FOR A BEZEL OR HOUSING ASSEMBLY

FIELD OF THE INVENTION

The present invention relates to display windows which are attached to assemblies. More specifically, the present invention relates to a display window that snaps into a computer bezel without using additional fasteners or adhesives, and without requiring a heat staking process.

DESCRIPTION OF THE RELATED ART

In the art of computing, as well as many other arts, it is common to use plastic windows through which status indicators may be observed. Typically, the windows are formed from a clear plastic material, such as polycarbonate film, and are attached to a bezel or other housing.

There are many methods known in the art for attaching a window to a bezel or housing, such as clips and fasteners, adhesives, and heat staking. However, each of these methods requires extra assembly steps, and possibly additional components.

SUMMARY OF THE INVENTION

The present invention is a window which is attached to bezel, housing, or other assembly. In accordance with the present invention, the bezel, housing, or other assembly has a series of pins surrounding an opening. The window has a corresponding series of holes, with the centers of the holes slightly off-center from the centers of the pins in one dimension.

When the window is pressed into place over the opening, the window is deflected slightly. This deflection causes the edges of the holes to "dig into" the pins, and retains the window in place over the opening. The present invention provides a simple, inexpensive, and effective way to attach a window to a bezel, housing, or other assembly, while also minimizing assembly time.

DETAILED DESCRIPTION OF THE PREFERRED EMBODIMENTS

Figure 1:
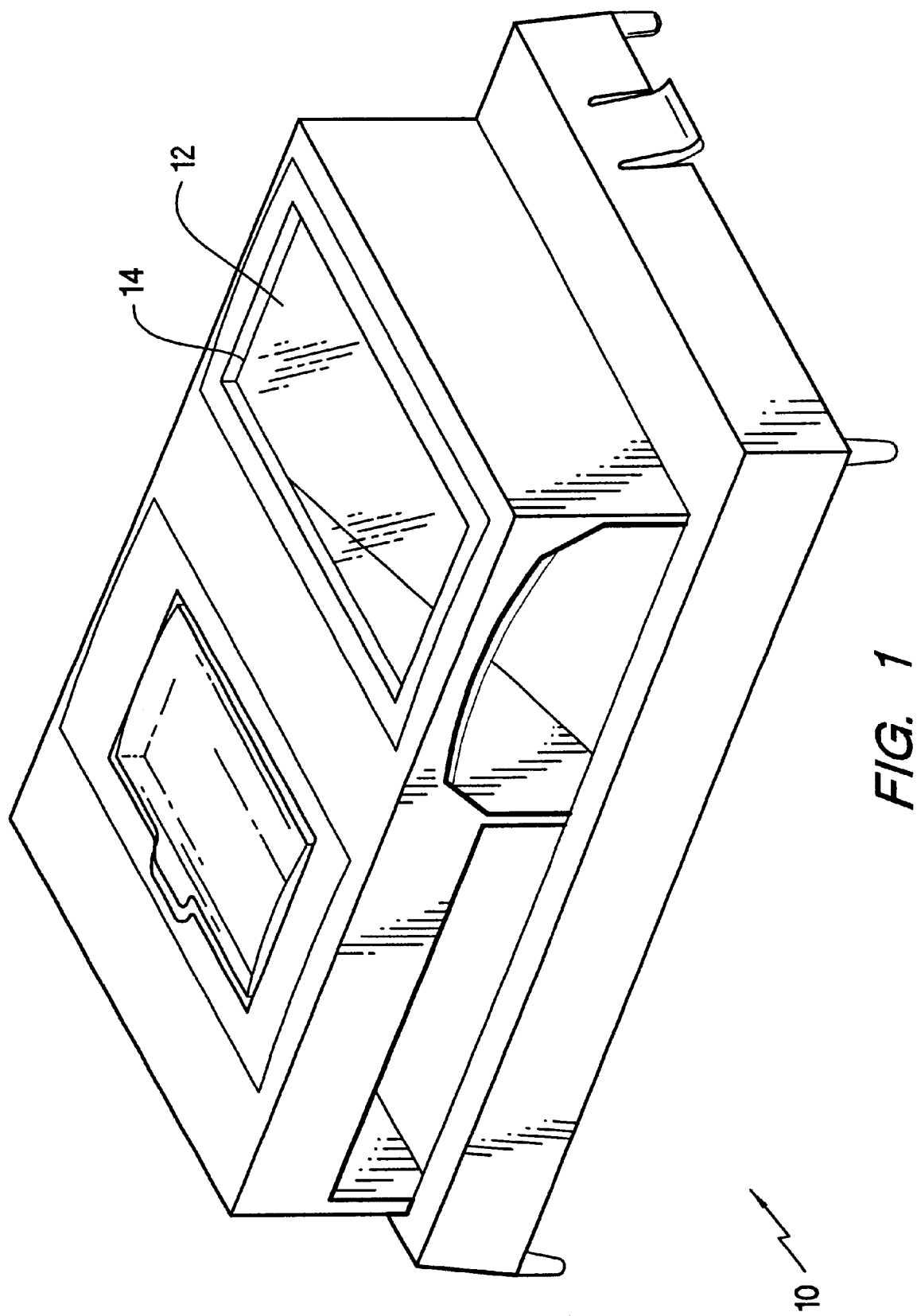
FIG. 1 is a perspective view from above a bezel having a window attached under an opening in the bezel, in accordance with the present invention.

FIG. 1 is a perspective view from above a bezel 10 having a window 12 attached under opening 14 in bezel 10, in accordance with the present invention. When assembled as part of a computer system, status indicators of the computer system, such as LED displays, may be observed through window 12.

Figure 2:
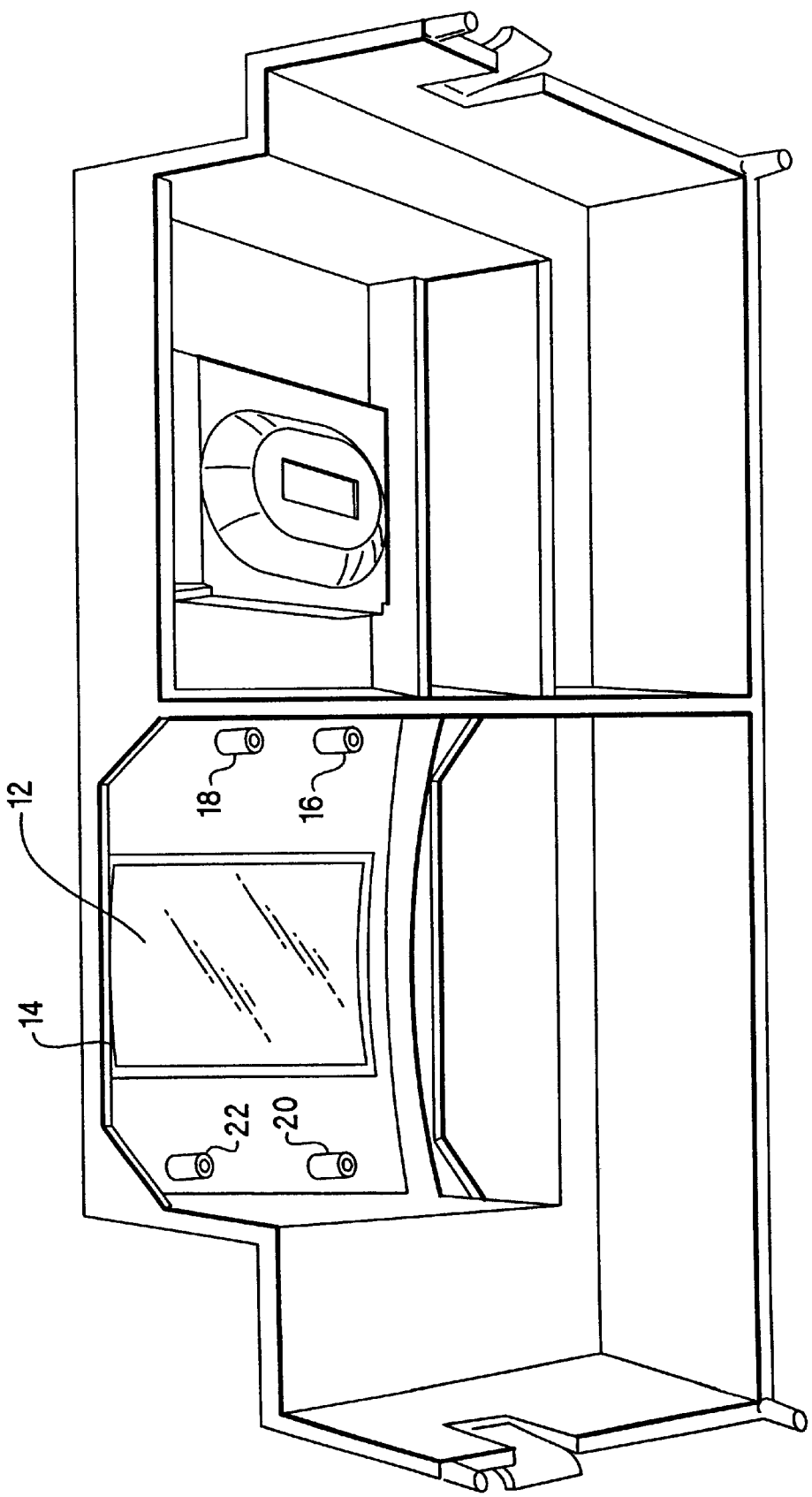
FIG. 2 is a perspective view from below the bezel shown in FIG. 1.

FIG. 2 is a perspective view from below bezel 10. As seen in FIG. 2, window 12 is attached to bezel 10 and covers opening 14. Window 12 includes four holes with slightly off-center from pins 16, 18, 20, and 22. The pins and holes are tapered, and guide window 12 into place and retain window 12 over opening 14, as described below.

Figure 3:
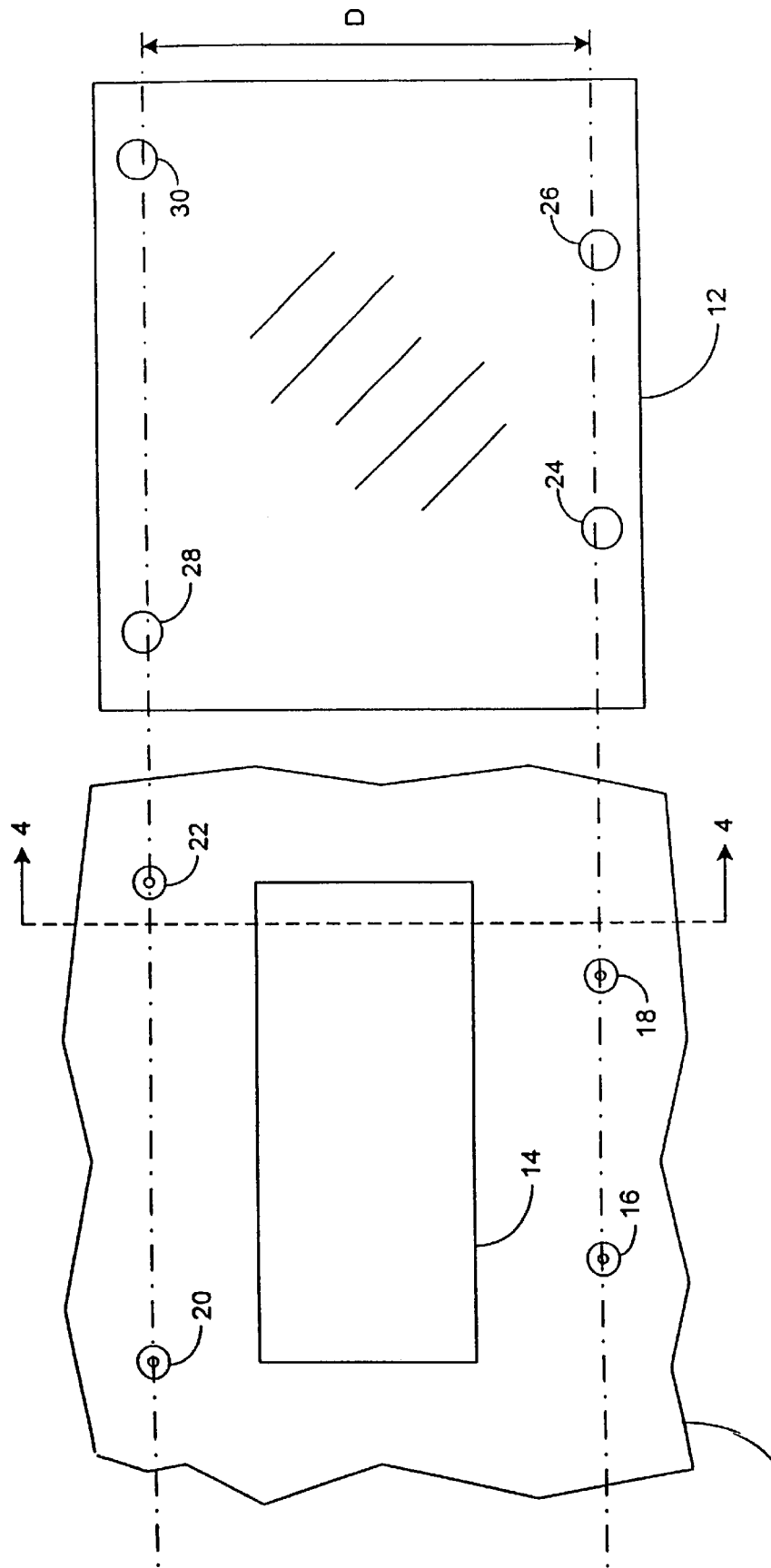
FIG. 3 shows a portion of the bezel of FIGS. 1 and 2 surrounding the opening, and also shows the window along side the portion of the bezel.

FIG. 3 shows a portion of bezel 10 surrounding opening 14. Shown along side bezel 10 is window 12. Window 12 includes holes 24, 26, 28, and 30. Pins 16, 18, 20, and 22 are positioned within holes 24, 26, 28, and 30, respectively, when window 12 is attached to bezel 10.

Note the center line which passes through pins 16 and 18 and the center line which passes through holes 20 and 22. These center lines are separated by distance D. Also note that the corresponding distance between the centers of holes 24 and 26, and holes 28 and 30, respectively, is slightly greater than distance D, this slight difference in distance along one dimension retains window 12 to bezel 10, as described below.

Window 12 will typically be formed from a thin sheet of clear plastic, such as a 0.10 inch thick sheet of polycarbonate film. One popular brand of polycarbonate film is Lexan®, which is a product of the General Electric Company. Of course, those skilled in the art will recognize that other materials and thicknesses may be used.

Figure 4:
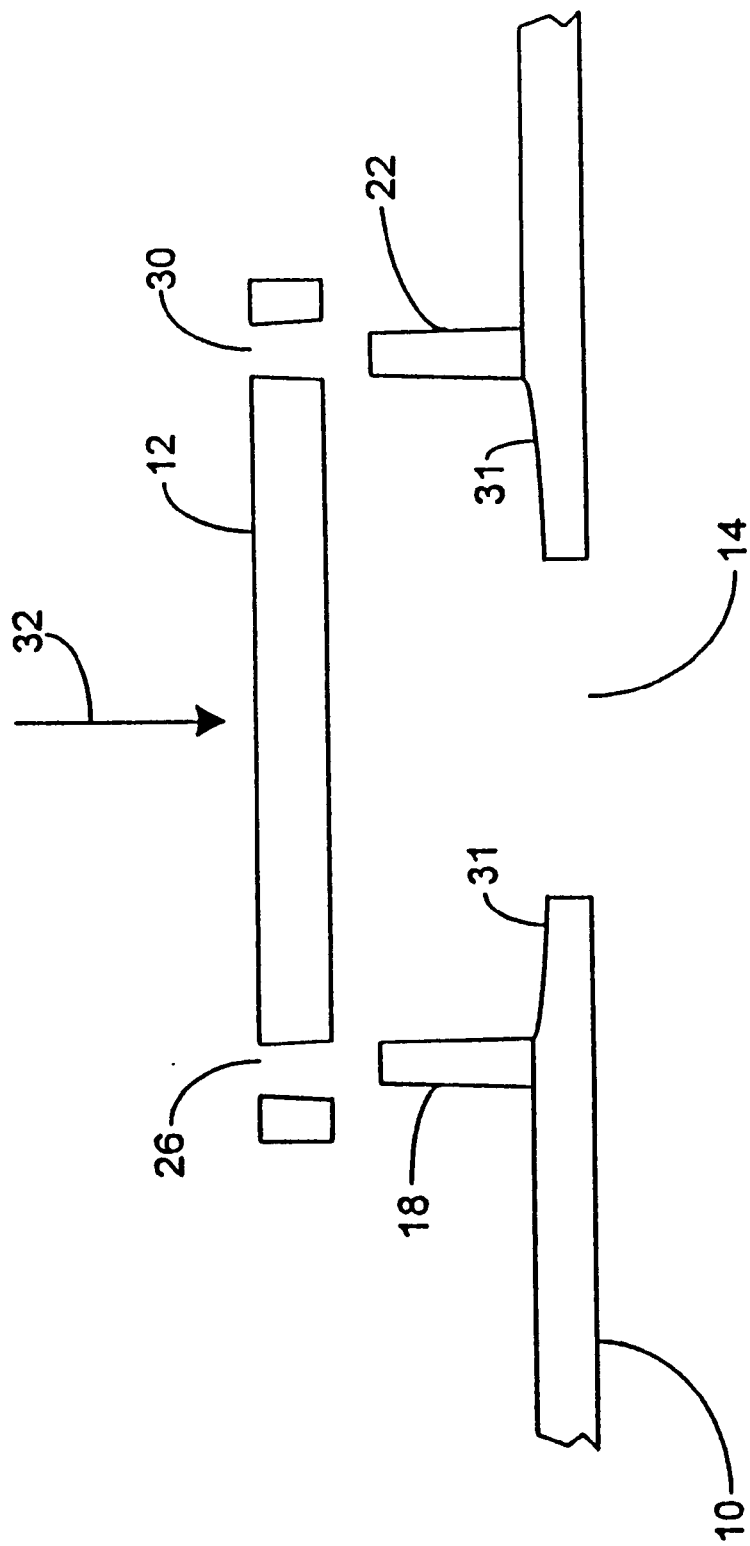
FIG. 4 is a partial view of the bezel taken along line 4—4 in FIG. 3, and also shows the window positioned above the bezel opening as it would be immediately before assembly.

FIG. 4 is a partial view of bezel 10 taken along line 4—4 in FIG. 3. In addition, window 12 is shown positioned above opening 14 as it would be immediately before assembly. Note that pins 18 and 22 and holes 26 and 30 (along with pins 16 and 20 and holes 24 and 28, which are not shown in FIG. 4) are tapered. Also note that surface 31 of bezel 10 is slightly curved.

When window 12 is to be attached to bezel 10, force is applied in the direction shown by arrow 32. Note that the taper of the pins and holes will allow the pins to initially register with the holes. Also note that since the holes are slightly farther apart than the pins, window 12 will not freely slide down the pins all the way. However, as force continues to be applied, window 12 will bow downward, thereby slightly decreasing the distance between the holes and allowing window 12 to be positioned flush with surface 31.

Figure 5:
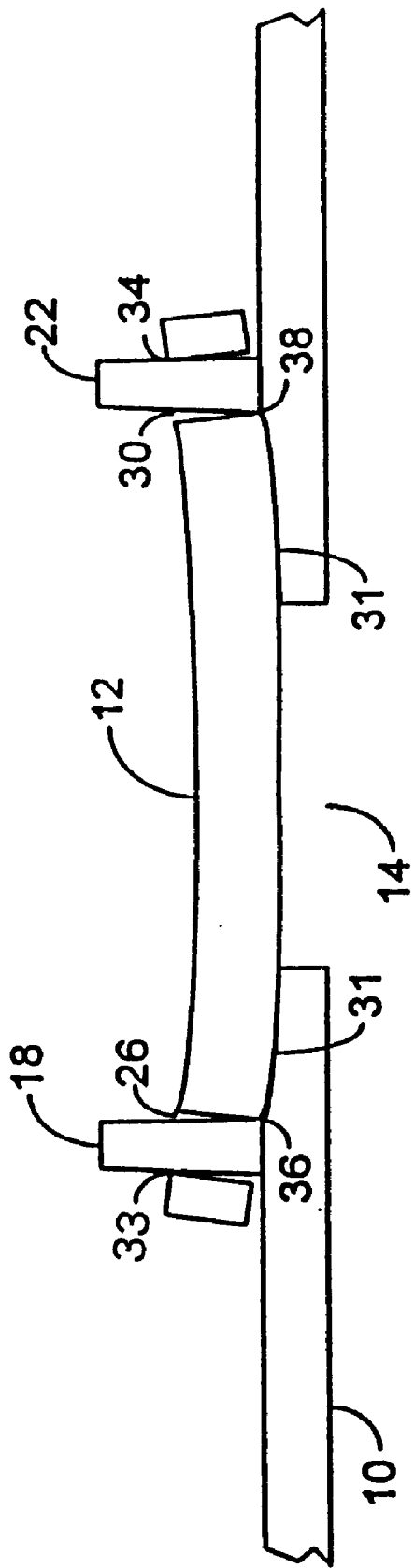
FIG. 5 is also a partial view of bezel taken along line 4—4 in FIG. 3, and shows the window after being assembled to the bezel.

FIG. 5 is also a partial view of bezel 10 taken along line 4—4 in FIG. 3, and shows window 12 after assembly. Note that window 12 is slightly bowed and is flush with surface 31. However, window 12 is resilient and therefore provides a restoring force that causes window 12 to attempt to return to its previously flat state. This restoring force causes edges 33 and 36 of hole 26 to "dig into" pin 18, and edges 34 and 38 of hole 30 to "dig into" pin 22. The same effect occurs with respect to pin 16 in hole 24, and with respect to pin 20 in hole 28, which are not shown in FIG. 5. Since the edges of the holes "dig into" the pins, window 12 is securely held in place without any additional fasteners, adhesives, or assembly steps.

Note that the distance separating the holes and the distance separating the pins must be closely controlled for the present invention to work properly. However, a designer implementing the present invention can provide herself or himself with an "insurance policy". With reference to FIG. 3, note that pins 16, 18, 20, and 22 are hollow. If for some reason window 12 does not bow sufficiently to retain window 12 in place, window 12 may be held in place using a heat staking process. In essence, a hot probe is pressed into the hollow openings within pins 16, 18, 20, and 22, and the pins are melted. This causes the pins to expand downward and outward, thereby retaining window 12 in place. While heat staking will not be required if window 12 and bezel 10 are properly fabricated, it is reassuring to know that injections molds will not need to be retooled in the event that the spacing between the pins and the holes is not perfect. Since retooling can have a negative impact on time-to-market, a product can still be shipped while the injection molds are retooled. After the injection molds have been retooled, the heat stacking process can be eliminated and the advantages of the present invention can be realized.

As described above, before assembly the window is flat and the holes in the window are slightly farther apart in one dimension than the corresponding pins on the bezel. By bowing the window during assembly, the holes are brought closer together and the window is pressed down upon the pins, thereby holding the window in place. However in another embodiment, the holes in the window are slightly closer together in one dimension than the corresponding pins on the bezel. In this embodiment, the window is formed with a slight bow. When the window is assembled, the window is positioned with the bow curving away from the opening. As the window is pressed onto the pins, the window is flattened, thereby increasing the distance between the holes and allowing the holes to slide over the pins. When assembled, the window is flatter than before assembly. In this embodiment, the restoring force of the window tends to attempt to return the window to its preassembled bowed state, thereby causing the window to be retained by the pins.

Another advantage of the present invention is that it can be fabricated using a relatively simple injection mold. In the prior art, it was common to hold windows to bezels using slots or tabs. Such slots or tabs require that the injection mold have complex slides or lifters to form multiple surfaces perpendicular to the direction along which the molds are separated. Since the pins of the bezel do not include multiple surfaces perpendicular to the direction along which the molds are separated, slides and lifters are not required in a mold that forms a bezel that uses the present invention. This reduces tooling and fabrications costs substantially.

In conclusion, the present invention provides a simple, inexpensive, and effective way to attach a window to a bezel, housing, or other assembly. The present invention also minimizes assembly time because a clear window is simply pressed onto pins surrounding an opening in the window, and is help in place by a restoring force caused by a slight deflection that results from the pins being slightly off-center in one dimension with respect to the holes in the window.

Although the present invention has been described with reference to preferred embodiments, workers skilled in the art will recognize that changes may be made in form and detail without departing from the spirit and scope of the invention.

What is claimed is:

1. An assembly having a window comprising:

a surface;

an opening within the surface, the opening having a first perimeter;

a plurality of pins extending outward from the surface proximate the opening;

a window having a second perimeter; and a corresponding plurality of holes in the window, with each pin extending into a hole, wherein a distance separating the corresponding plurality of holes is slightly different in one dimension than a distance separating the plurality of pins before the window is assembled, and after assembly the window is slightly deflected from its normal preassembled state, thereby causing a resulting restoring force to hold the window in place by allowing edges of the plurality of holes to dig into the plurality of pins, and wherein the first perimeter is within the second perimeter when viewed from an angle perpendicular to the surface.

2. The assembly of claim 1 wherein the distance separating the corresponding plurality of holes is slightly greater in one dimension than the distance separating the plurality of pins before the window is assembled, the window is relatively flat before assembly, and has a slight bow after assembly.

3. The assembly of claim 1 wherein the distance separating the corresponding plurality of holes is slightly less in one dimension than the distance separating the plurality of pins before the window is assembled, the window is bowed before assembly, and is flatter after assembly.

4. The assembly of claim 1 wherein each of the corresponding plurality of pins are hollow, thereby allowing the window to be retained to the assembly using a heat stacking process.

5. The assembly of claim 1 wherein the assembly is a housing.

6. The assembly of claim 1 wherein the assembly is a bezel.

7. The assembly of claim 1 wherein the window is formed from a clear sheet of plastic film.

8. The assembly of claim 7 wherein the window is formed from a 0.10 inch thick sheet of polycarbonate film.

9. The assembly of claim 1 wherein each of the corresponding plurality of holes are tapered.

10. The assembly of claim 1 wherein each of the plurality of pins are tapered.

11. The assembly of claim 1 wherein each of the plurality of pins and each of the corresponding plurality of holes are tapered.

12. An method of assembling a window to an assembly comprising:

positioning a window having a first perimeter over a surface of the assembly, wherein the surface includes an opening having a second perimeter and a plurality of pins extending outward, and the window includes a corresponding plurality of holes, wherein a distance separating the corresponding plurality of holes is slightly different in one dimension than a distance separating the plurality of pins; and pressing the window onto the plurality of pins, thereby deflecting the window to cause the distance separating the corresponding plurality of holes to become closer to the distance separating the plurality of pins and thereby causing a resulting restoring force to hold the window in place by allowing edges of the plurality holes to dig into the plurality of pins, and wherein the second perimeter is within the first perimeter when viewed from an angle perpendicular to the surface.

13. The method of claim 12 wherein the distance separating the corresponding plurality of holes is slightly greater in one dimension than the distance separating the plurality of pins before the window is assembled, the window is relatively flat before assembly, and has a slight bow after assembly.

14. The method of claim 12 wherein the distance separating the corresponding plurality of holes is slightly less in one dimension than the distance separating the plurality of pins before the window is assembled, the window is bowed before assembly, and is flatter after assembly.

15. The method of claim 12 wherein the assembly is a housing.

16. The method of claim 12 wherein the assembly is a bezel.

17. The method of claim 12 wherein the window is formed from a clear sheet of plastic film.

18. The method of claim 17 wherein the window is formed from a 0.10 inch thick sheet of polycarbonate film.

19. The method of claim 12 wherein each of the corresponding plurality of holes are tapered.

20. The method of claim 12 wherein each of the plurality of pins are tapered.

21. The method of claim 12 wherein each of the plurality of pins and each of the corresponding plurality of holes are tapered.

* * * * *